United States Patent [19]

Robertsson

[11] 4,218,138
[45] Aug. 19, 1980

[54] METHOD AND MEANS FOR DETERMINING POSITIONS OF REFLECTORS WITH FAN-SHAPED BEAMS

[75] Inventor: Hans R. Robertsson, Jonkoping, Sweden

[73] Assignee: Saab-Scania Aktiebolag, Linköping, Sweden

[21] Appl. No.: 14,117

[22] Filed: Feb. 22, 1979

[30] Foreign Application Priority Data

Mar. 2, 1978 [SE] Sweden .................. 7802348

[51] Int. Cl.$^3$ .................. G01B 11/26; F41F 27/00; F41G 3/26
[52] U.S. Cl. .................. 356/152; 35/25; 89/41 L; 235/412; 273/312; 356/5; 455/603; 455/600
[58] Field of Search .................. 35/25; 273/102.2 R, 273/102.2 B; 356/4, 5, 152; 250/199, 203 R; 89/41 L; 364/423; 235/412

[56] References Cited

U.S. PATENT DOCUMENTS

| | | | |
|---|---|---|---|
| 2,514,617 | 7/1950 | Albersheim | 343/10 |
| 3,056,129 | 9/1962 | Albersheim | 343/11 VB |
| 3,484,167 | 12/1969 | Burns, Jr. | 356/5 |
| 3,588,108 | 6/1971 | Ormiston | 273/102.2 R |
| 3,609,883 | 10/1971 | Erhard | 35/25 |
| 3,832,791 | 9/1974 | Robertsson | 35/25 |
| 3,907,433 | 9/1975 | Nault | 35/25 |
| 4,123,165 | 10/1978 | Brown et al. | 250/203 R |

FOREIGN PATENT DOCUMENTS 2149701 10/1971 Fed. Rep. of Germany .............. 35/25
1161027 8/1969 United Kingdom .................. 244/3.16

*Primary Examiner*—S. C. Buczinski
*Attorney, Agent, or Firm*—Nilles & Custin

[57] ABSTRACT

The positions of target reflectors at a distance from a measuring station are measured with fan-shaped angularly sweeping beams of radiation emitted from the measuring station and reflected back to a detector there when each beam is intercepted by a reflector. Expected reflector distribution is analyzed to ascertain, as between adjacent reflectors at equal distances from the station, the minimum projected distance expectable between such reflectors in a separation direction in which separation can be maximum and the maximum projected distance between them in the transverse direction. Each of at least two beams has its long cross-section dimension oriented to be at an angle to that of the other and at an angle to the separation direction which is such that its tangent value is greater than the ratio of said maximum distance to said minimum distance. Each of those beams is swept to move between intersection with an origin point on one side of a solid angle space swept by the beams and intersection with another point that is on the opposite side of said space and is spaced in the separation direction from the origin point. Angular positions of both beams are assigned increasing magnitudes with increasing distance from the origin point, for unambiguous measurement of target positions. For a given orientation of long cross-section dimensions of each beam, targets at like distances from the station must each be in an hour-glass-shaped region of isolation related to that beam orientation.

13 Claims, 14 Drawing Figures

METHOD AND MEANS FOR DETERMINING POSITIONS OF REFLECTORS WITH FAN-SHAPED BEAMS

FIELD OF THE INVENTION

This invention relates to a method and means for ascertaining the position of a body that is at a distance from a measuring location; and the invention is more particularly concerned with measurement of the location of each of a plurality of such bodies with the use of fan-shaped beams of radiation that are swept flatwise angularly.

BACKGROUND OF THE PRIOR ART

Systems for determining the position of a radiation-reflecting body have been proposed wherein two fan-shaped beams of radiation, such as laser radiation, were swept flatwise angularly across a solid angle that had the emitter of the radiation at its apex. By reason of the fanwise divergence of each beam in the direction away from the emitter, each beam had a long dimension in cross-section and a transverse narrow one. In most such prior systems each beam had its said long dimension oriented at right angles to that of the other and was swept transversely to that long dimension. Usually the beams were swept alternately in a repetitive sweep cycle. By taking note of the angular position of each beam in its sweep at the instant when a reflection from a body was received at the emitter location, two of the three coordinates that define the position of the body in the space swept by the beams could be known.

It is also readily possible to obtain information about the distance between a radiation emitter and a reflecting body by measuring the time interval between emission of radiation and reception of the reflected radiation at the emitter. That time interval is of course a simple function of the distance to be measured.

Heretofore these theoretical possibilities for determining the location of a reflecting body by means of a pair of fan-shaped, flatwise sweeping beams of radiation could be satisfactorily realized only on the condition that there was no more than one such body in the space swept by the beams. As soon as two or more such bodies were present in that space, they gave rise to a problem of ambiguity to which there was no completely satisfactory solution.

The nature of the ambiguity problem is pointed out in U.S. Pat. Nos. 2,514,617 and 3,056,129, both issued to W. J. Albersheim. The problem can be more fully understood from a consideration of FIG. 1 of the accompanying drawings, wherein fan-shaped beams x and y are shown in cross-section. Those two beams alternately sweep across a space 1, the beam x being swept flatwise horizontally and the beam y being swept flatwise vertically. If reflecting bodies are present in the space at the positions denoted by A and B, then a reflection will be detected at the beam emitter location at the instant when the x beam is at the position of its sweep designated by $x^1$ and again when it is at the position designated by $x^2$. Similarly, reflections of the y beam will be received at the instant when it is in its angular positions of sweep that are respectively designated by $y^1$ and by $y^2$. These received reflections correspond to four possible positions A, B, C, D at which reflecting bodies may be present in the swept space, and from the available information it is equally as probable that bodies are present at positions C and D as at positions A and B.

In general, such an ambiguity can arise whenever the number of reflectors in a space swept by fan-shaped beams is equal to or greater than the number of beams sweeping the space. The implication of this principle is that ambiguities could be resolved by the employment of a sufficiently large number of discrete beams. But it is obvious that if the presence of numerous reflecting bodies could be expected, it would be difficult to generate a sufficient number of beams, all oriented at different angles, and to synchronize their several sweeps and calculate the measurement results obtained with them.

The two Albersheim patents suggest the employment of so-called range gating by which indications are accepted only from those targets that are at a predetermined distance from the measuring station, or within a predetermined range of distances from that station. Range gating can reduce the number of bodies that must be identified, but it is of no avail when two reflecting bodies are at the same distance from the measuring station and give rise to the ambiguity problem just explained. Albersheim U.S. Pat. No. 2,514,617 proposed an expedient for resolving that ambiguity, but as stated in the later Albersheim patent, the system of that earlier patent required the performance of a number of time consuming operational steps and was therefore unsatisfactory in applications where time was of the essence. The later Albersheim patent proposed an expedient which required more complicated and costly apparatus and which, although faster, was still rather slow in that it required the performance of several calculating operations for the purpose of obtaining information about actual reflector locations. There is also reason to doubt that the system of the later Albersheim patent could produce unambiguous results under all circumstances.

Those skilled in this field of art will recognize that there are a variety of applications in which fan-shaped flatwise sweeping beams could be used for complete measurement of reflecting body locations, given a solution to the problem of unambiguous identification of individual bodies when plural bodies appear in the space swept by the beams and particularly when two or more bodies in that space are at the same distance from the measuring station. As examples of such applications, mention can be made of systems for supervision and control of taxiing aircraft on an airport, measurement of air or water currents by tracking of balloons or floats that move with the current, and continuous measurement of positions of boats in a sailing competition.

An application which is of particular concern, and which particularly exemplifies the utility of the present invention, is that of measurement of target location in simulated weapons fire scoring systems. One such system is disclosed in U.S. Pat. No. 3,832,791, wherein a beam having a substantial amount of divergence was emitted from the weapon location so that any target at which the weapon was aimed could reflect radiation back to the weapon location, notwithstanding gun elevation and aiming lead to compensate for target movement. A first emission of the beam, occuring at the instant of simulated firing, was employed to obtain a ranging fix on the target; and after an interval equal to the calculated time required for a round of ammunition to arrive at the target, a second emission of the beam was modulated to encode information about ammunition type and point of impact of the simulated round in relation to the target, so that hit effect could be evaluated at the target. Because of the divergence of the beam, it was necessary to have a specialized and relatively expensive detector that could distinguish between reflections from target reflectors that were at the same range and relatively close to one another, and transmissions could not be made on the beam exclusively to a detector co-located with a particular one of such reflectors. Therefore there were many tactical situations in which accurate scoring results could not be obtained. As a further result of the divergence of the beam and the consequent diffusion of its radiation, the system had relatively poor range for a given amount of radiation energy and had a poor ratio of signal to background disturbance.

By contrast, the general object of the present invention is to provide a measuring system wherein beamed radiation is employed for accurate determination of the position of a reflecting target, which system is better suited to simulated weapons fire scoring applications than prior such systems, and is also very advantageously applicable to many other types of equipment for remote measurement of positions of objects.

Application of the present invention to a system for scoring simulated gunnery practice requires the solution of certain further problems, and with respect to these the present disclosure is supplemented by the disclosures of two copending applications, Ser. No. 14,115 and Ser. No. 14,116.

Ser. No. 14,116 relates to a method and means for effecting selective delivery of information encoded in the modulations of flatwise sweeping fan-shaped beams, so that information intended only for one of a plurality of bodies in the space swept by the beams will be delivered exclusively to that one body.

The other copending application, Ser. No. 14,115 is somewhat more closely related to the subject matter of the present invention, inasmuch as it discloses a gunnery practice scoring system which, in one of its operating modes, employs periodically sweeping fan-shaped beams for making measurements of target position from and after the instant of simulated firing of a weapon, and simultaneously makes a calculation of the position of an imaginary projectile in its trajectory. The trajectory calculation simulates the flight that a selected type of real projectile would have had if fired from the weapon with its barrel axis oriented as at the instant of simulated firing. At the instant when the calculated position of the imaginary projectile brings it to a distance from the weapon location that is equal to the weapon-to-target distance, or when the imaginary projectile reaches a predetermined elevation relative to target elevation, the calculation can stop and results can be scored at the weapon location on the basis of the relationship between projectile position and target position at that instant.

In such a scoring system, each target comprises a reflector by which intercepted radiation emitted from the weapon location is reflected back to that location. The beams are pulsed so that reflected radiation, detected at the weapon location, can be employed there for measuring distance to the reflector. Target reflector azimuth and elevation relative to the weapon location are measured by taking account of the momentary angular position of each beam in its sweep at the time its radiation, reflected from the reflector, is detected at the weapon location.

It will be apparent that accurate and realistic utilization of such a scoring system requires that when reflections are received during the course of a beam sweep from two or more target reflectors that are at equal distances from the weapon position, the scoring apparatus shall not respond to spurious target positions created by the above described ambiguity problem and should be capable of discriminating between adjacent reflectors. This requirement is imposed because there are many tactical situations—for example, tank maneuvers—in which two or more target reflectors may be present in proximity to one another and at substantially equal distances from a weapon that has them in its field of fire, and such tactical situations should be reproduced during training exercises in the interests of training effectiveness. Obviously range gating would not be satisfactory for unambiguous determination of the positions of the targets in such a situation.

With the foregoing considerations in mind, the general object of the present invention can be more fully stated as being to provide a method and means for unambiguously ascertaining at a measuring station, by means of fan-shaped, flatwise sweeping beams emitted therefrom, the position relative to said station of each of a plurality of reflectors that may be present in a solid angle which is swept by the beams and which has the station at its apex.

A more specific object of the invention is to provide a measuring system wherein fan-shaped beams of radiation are emitted from a measuring station and are swept flatwise angularly across a solid angle space that has the measuring station at its apex, wherein said beams are employed to ascertain the position within said space of a reflector of beam radiation that is at a distance from the measuring station, and whereby an unambiguous determination can be made of the position of each of a plurality of such reflectors that may be present in said space.

Another specific object of this invention, and a very important one, is to provide a method and means for rapidly and efficiently resolving the ambiguity that has heretofore arisen with the use of flatwise-sweeping fan-shaped beams used for measurement of the positions of reflectors in the space swept by the beams when the number of reflectors in that space was equal to or greater than the number of beams employed.

Other objects of the invention include the provision of a fast method of measurement wherein radiation emitted from a measuring station is employed to obtain an unambiguous measurement of the position of each of a group of reflectors in an area remote from the measuring station, or of the position of a selected one of such reflectors, and whereby such position measurements can be obtained as functions of range, azimuth and elevation relative to the measuring station, which method can be practiced with simple automatic equipment, ensures good range and high sensitivity by reason of low radiation diffusion, and affords the capability for discriminating between reflectors that are relatively close to one another.

SUMMARY OF THE INVENTION

The objects of the invention are achieved in apparatus by which the position of any one of a plurality of reflectors can be unambiguously determined in relation to a measuring station at the apex of a solid angle space in which the reflectors are located, each of said reflectors being of the type whereby intercepted radiation is reflected in the direction directly opposite to the one from which it arrived at the reflector, and the reflectors being so distributed in said space that adjacent reflectors at equal distances from said station will always be separated by at least a minimum projected distance in a separation direction and will be separated by no more than a maximum projected distance in a direction transverse to said separation direction, said apparatus being of the type comprising a radiation emitter at the measuring station for emitting a plurality of fan-shaped beams of radiation, each of which has a long cross-section dimension and a short cross-section dimension, said emitter being arranged to sweep each beam angularly, substantially transversely to its said long dimension, across said solid angle space, said apparatus being characterized by: said emitter being further arranged to emit at least two of said beams with their said long dimensions oriented at an angle to one another and at an angle to said separation direction which is such as to have a tangent value at least equal to the ratio of said maximum distance to said minimum distance, and to sweep each of said at least two beams in a direction such that each is carried between its intersection with an origin point at one side of said space and its intersection with another point which is at the opposite side of said space and which is spaced in said separation direction from the origin point. For each of said at least two beams, increasing magnitudes are consistently assigned to angular positions at increasing distances from the origin side. Whenever a reflection of one of said two beams is detected at the measuring station, the magnitude of the angular position of that beam at that instant is stored, and reflector positions are unambiguously ascertained by coupling stored values for each of said two beams, in a consistently progressive order of magnitude, with those for the other, taken in the same order.

BRIEF DESCRIPTION OF DRAWINGS

In the accompanying drawings, which illustrate embodiments of the invention now regarded as the preferred modes of practicing its principles.

DETAILED DESCRIPTION OF THE INVENTION

Figure 1:
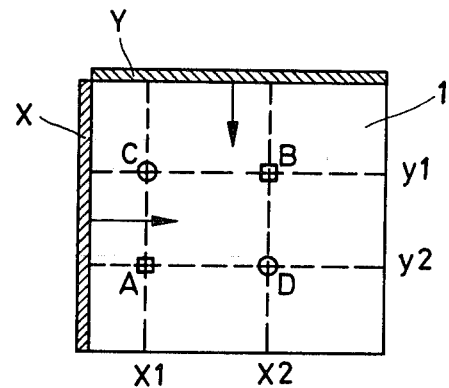
FIG. 1 is a view in cross-section of a space swept by a pair of fan-shaped beams, illustrating the problem of measurement ambiguity that is solved by the present invention.

Referring now to the accompanying drawings, FIG. 1 illustrates a training exercise involving use of a weapon 5 carried by a tank 2 for simulated firing at one of a group of real or dummy target bodies 10, 10', 10".

Figure 4:
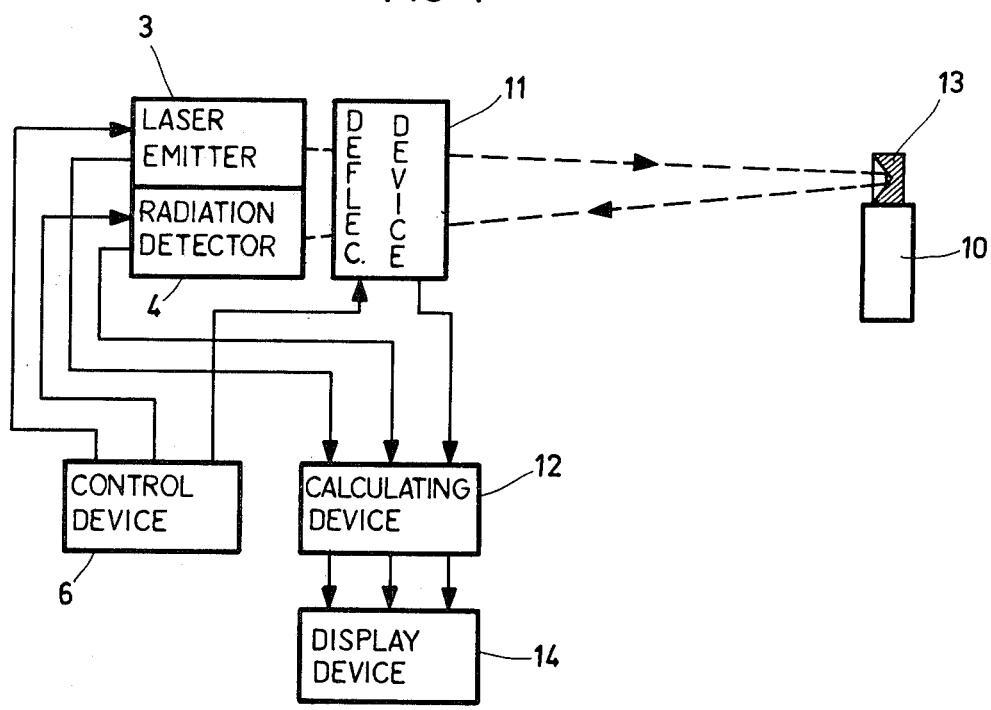
FIG. 4 is a block diagram of apparatus embodying the principles of this invention.

Aiming and simulated firing of the weapon 2 are in all respects carried out as for firing of a real projectile, but for training purposes the weapon 5 is equipped with measuring apparatus that comprises (see FIG. 4) a radiation emitter 3 which preferably comprises a laser, a radiation detector 4, and a control device 6 that coordinates operation of the radiation emitter 3 and detector 4 with the firing mechanism of the weapon 5. Each of the target bodies 10, 10', 10" is equipped with at least one reflector 13, in each case a so-called corner reflector or retroreflector by which radiation that falls upon the reflector is reflected in the direction directly opposite to the one from which it arrived. (For clarity FIG. 4 shows the path of reflected radiation as somewhat divergent from that of emitted radiation.) Thus, upon simulated firing of the weapon 5, the emitter 3 is caused to emit radiation towards the target bodies 10, 10', 10", and such radiation, reflected back to the weapon location 2 and detected by the detector 4, is employed for measuring target position in range, azimuth and elevation in relation to the weapon location. Since measurements are always made to a reflector, rather than to a target body generally, the terms target and reflector are herein used synonymously.

For explanation of how measurements made with radiation from the emitter 3 are employed in scoring the results obtained with simulated firing, reference may be made to the above-mentioned copending application, Ser. No. 14,115. However, without further details it will be apparent that for valid and accurate scoring results such measurements must be made unambiguously, and must not be made on spurious reflector positions such as would arise with prior systems as a result of the presence of a plurality of reflectors in the target area.

It will be understood that weapon fire scoring apparatus is merely illustrative of the many possible applications for the present invention, and that the weapon location exemplified by the tank 2 typifies any measuring station from which the position of each of a plurality of remote reflecting objects or bodies can be unambiguously ascertained with the use of radiation in accordanced with the principles of this invention.

In accordance with the invention, the radiation emitted from the laser 3 is formed into fan-shaped beams 7' and 7" in a known manner. As shown in FIG. 1 there are only two beams, but it will be understood that the radiation could be formed into three or more beams. In cross section—i.e., transversely to the direction of propagation, as the beams are shown at 8', 8"—each beam has a long dimension and a relatively short dimension that is transverse to its long dimension. Thus each beam diverges in the direction of propagation in its long cross-section dimension but has very little such divergence in the transverse cross-section dimension.

Each of the beams into which the radiation is formed should have its long cross-section dimension at an angle to that of every other beam. Although not essential, it is usually advantageous if the beams have a symmetrical relationship of their long cross-section dimensions to one another, as for example two beams can have their long cross-section dimensions at equal but opposite oblique angles to the vertical, and if there is a third beam it can be oriented either vertically or horizontally, depending upon sweep direction.

By means of a deflection device 11 that is associated with the emitter 3 and the detector 4, each beam is swept angularly, substantially transversely to its long dimension, so that the beams collectively sweep a solid angle space that has the measuring station 2 at its apex. The object or objects to which measurements will be made by means of the beams will of course be located in that solid angle space, in this case in a target area 9.

The deflecting device 11 by which sweeping motion of the beams is produced can comprise optical wedges that move relative to one another and are located in an optical path that is common to the emitter 3 and the detector 4. The deflection device 11, the laser 3 and the detector 4 can be built as a unified assembly that is detachably mounted on or in the barrel of the weapon 5.

The beams may be swept either sequentially or simultaneously, and each beam may sweep either back and forth or always in one direction, but in any case it will be preferable for the beams to have a consistent pattern of sweep and to make their respective sweeps in the course of a repetitive sweep cycle having a predetermined duration.

For the purpose of distance measurement, the beam radiation is pulsed. Such pulsing can take the form of a modulation by which information is encoded in the beam for transmission to all bodies that intercept the beam or for transmission to a particular one of such bodies, as explained in the copending application, Ser. No. 14,116. When a pulse of radiation is emitted, a signal is sent from the emitter 3 to a calculating device 12, and subsequently, when a reflection of the emitted radiation is detected by the detector 4, the detector converts it into an electrical impulse which is also sent to the calculating device 1. Distance from the measuring station to the target is thus measured on the basis of time elapsed between emission of radiation and receipt of its reflection. The output of the calculating device 12 is fed to a suitable display device 14. The control device 6 that is connected with the firing mechanism of the weapon times the emission of radiation pulses from the laser 3 and the cycling of the deflection device 11 and controls the feeding of signals to the calculating device 12.

As the deflection device 11 causes the beams to swing in their sweeps, it issues signals which, at every instant, correspond to the momentary angular position of each beam in its sweep. Thus, when a reflection from a target is detected by the detector 4, the control device 6 causes the then-prevailing signal from the deflection device 11 to be fed to the calculating device 12. Accordingly, if reflections of each beam in its sweep are received from a reflector during the course of a complete sweep cycle, the calculating device 12 receives information from which it can calculate functions of the azimuth and elevation of the target as well as its range, thus completely defining the position of the target in relation to the measuring station.

According to the present invention, the heretofore existing problem of ambiguity in the measurement of target positions in azimuth and elevation is avoided by a proper relationship between the orientations of the long dimensions of the two beams (or of at least two of the beams if there are more than two), and by assinging a proper direction of sweep movement to each of those two beams, all in relation to the expectable distribution of targets or reflectors in the solid angle space swept by the beams. Of particular concern is the relationship between any two adjacent reflectors that are at substantially the same distance from the measuring station 2. Reflectors at measurably different distances from the measuring station present no significant problem because it is possible to distinguish them from one another at the measuring station by range gating or by range measurements.

Figure 3:
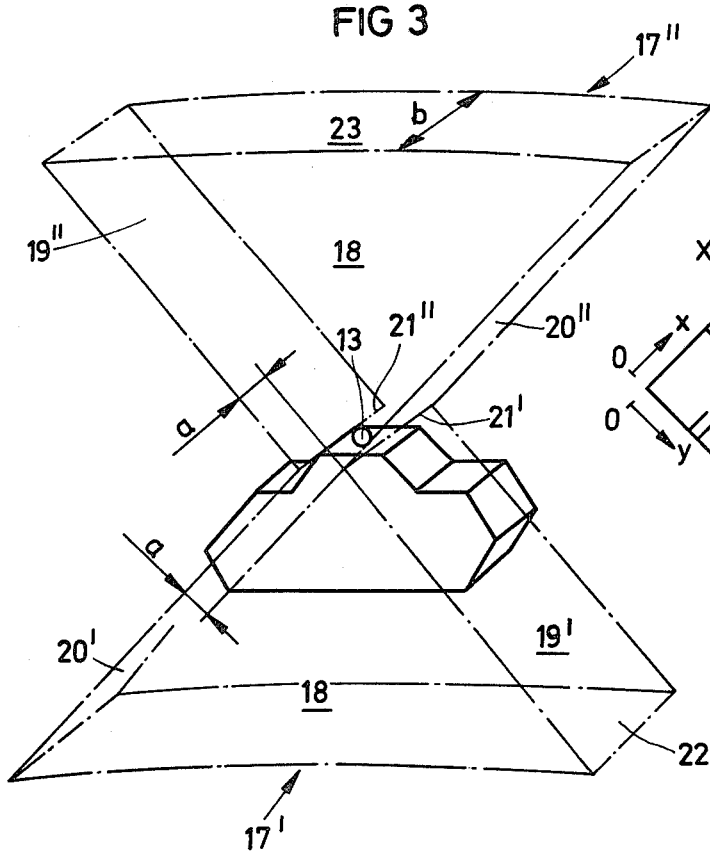
FIG. 3 is a perspective view illustrating a reflector mounted on a target body, shown in relation to a region around that reflector in which no other reflector is to be present in accordance with the principles of this invention.

The first step in establishing the beam arrangement, therefore, is to determine the direction in which there is most likely to be a maximum projected distance between adjacent reflectors that are at the same distance from the measuring station, and that direction of possible maximum separation is herein referred to as the separation direction. Assuming that the tanks 10, 10' and 10" in FIG. 3 are at the same distance from the measuring station 2, there can be a maximum separation between them in a horizontal or substantially horizontal direction because they are on the surface of the earth. In this case, therefore, the separation direction can be taken as horizontal. Aircraft following a taxiway that leads to an elevated control tower comprising a measuring station would tend to have maximum separation in a separation direction that could be regarded as vertical.

Figure 2:
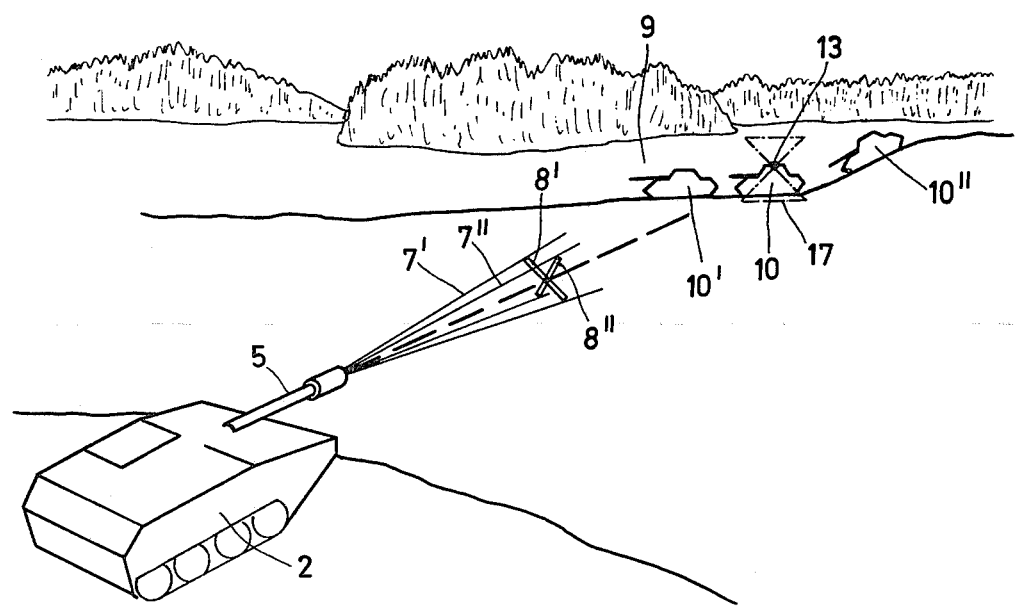
FIG. 2 is a perspective view of a simulated tactical situation illustrating the application of the principles of the present invention to the scoring of simulated weapon fire.

In each case the projected distance between reflectors in the direction transverse to the separation direction will vary between zero and some more or less easily ascertainable maximum value. Thus vertical separation between the reflectors 13 and 13' on the respective tanks 10 and 10' in FIG. 2 is substantially zero, and maximum vertical separation would be attained between reflectors 13 and 13" if the tank 10" carrying reflector 13" were on the crest of the hill on which it is shown.

With the separation direction established, it will usually be found that as between adjacent reflectors at the same distance from the measuring station there is an ascertainable minimum projected distance in that direction. In the case of the tanks 10, 10', 10" in FIG. 2, each of which has its reflector mounted midway between its front and rear ends, the least possible projected distance between reflectors in the horizontal separation direction is of course substantially equal to the length of a tank, assuming that the tanks will always present their side profiles to the measuring station 2 when measurements are to be made. If they may be oriented in any direction, and a reflector is mounted midway between the sides of each tank, the width of a tank would be taken as the minimum spacing in the measurement direction, since reflectors would be nearest one another with the tanks side-by-side.

Figure 12:
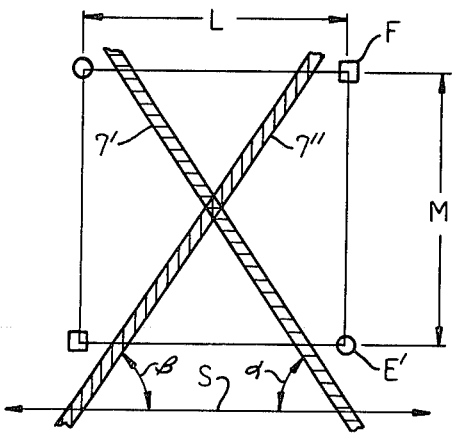
FIG. 12 is a diagrammatic view showing how criterion beams are oriented in relation to expectable reflector distributions.

Still having regard only to reflectors at the same distance from the measuring station, the orientations of at least two of the beams are established on the basis of the minimum probable projected distance between adjacent reflectors in the separation direction and the maximum probable projected distance between such reflectors in the transverse direction. FIG. 12 depicts these relationships for two cases that can exist under the same arbitrarily chosen set of conditions but at different times. Reflectors E and E' are assumed to be adjacent to one another and at the same distance from a measuring station (not shown), and they are illustrating as being as close to one another as they can get in the separation direction S (which is here illustrated as horizontal) and as far apart as they can get in the transverse direction (i.e., vertically). Hence, the minimum projected distance between them in the separation direction S is given by L and the maximum projected distance between them in the transverse direction is given by M. Alternatively, under these same conditions, two adjacent reflectors could occupy the positions designated by F and F', but in the nature of the situation the reflectors F, F' could not be present at the same time as the reflectors E, E'.

According to this invention, at least two of the beams 7', 7" of the sweeping beam system must have their long cross-section dimensions so oriented that each is at such an angle $\alpha$, $\beta$, respectively, to the separation direction S that the value of the tangent of that angle is greater than the ratio of the maximum projected distance L in the separation direction to the maximum projected distance M in the transverse direction. The angle just mentioned must be sufficiently greater so that neither criterion beam can be intercepted by more than one reflector at a time, assuming either of the "worst case" reflector arrangements E, E' or F, F' shown in FIG. 12.

If the system has more than two beams, other beams may be oriented at other angles, but there must always be at least two beams oriented as just explained, and those two beams are hereinafter referred to as the criterion beams.

Figure 13:
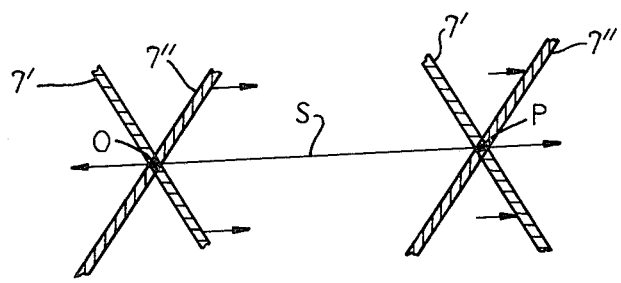
FIG. 13 is a diagram illustrating direction of sweep of criterion beams.

Each of the two criterion beams must of course sweep across a solid angle space in a direction or directions substantially transverse to its long cross-section dimension, but in accordance with the principles of the invention the direction of sweep must be so chosen that in its sweep (see FIG. 13) each beam moves between intersection with an origin point O which is on one side of the solid angle space and intersection with another point P which is on the opposite side of that space and which is spaced in the separation direction S from the origin point. Within this constraint it is immaterial whether either beam sweeps from the origin point O to the other point P, or in the opposite direction, or back and forth. The origin point O can be at either side of the solid angle space, so long as the other point P is at the opposite side of that space and spaced from it in the separation direction.

With the criterion beams oriented and swept as explained above, magnitudes are assigned to angular positions of each beam that increase with increasing distance of the beam from its intersection with the origin point O.

Figure 5:
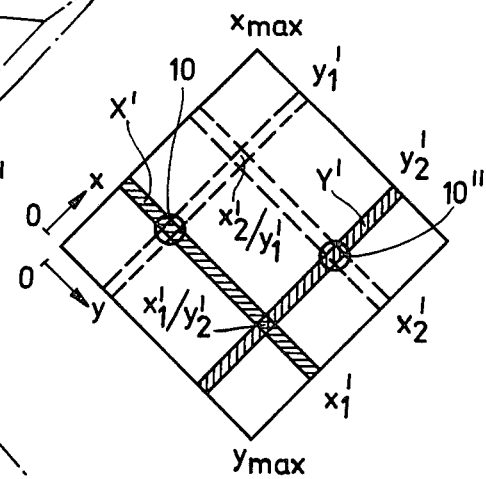
FIG. 5 is a view generally similar to FIG. 1 but illustrating a beam arrangement that embodies the principles of this invention and is suitable for cooperation with the reflector arrangement shown in FIG. 3.

Assume, now, that measurements are to be made to reflectors on the two target bodies 10 and 10" in FIG. 2, and that the measurements are to be made with two beams x' and y', as shown in FIG. 5, that have their long dimensions oriented at opposite 45° angles to the horizontal. The beam y' is shown as sweeping diagonally downwardly at right angles to its long dimension, and the beam x' is shown as sweeping diagonally upwardly, likewise at right angles to its long dimension, so that the beams sweep a diamond-shaped space and each beam moves between intersection with an origin point at the left-hand corner of the space swept by the beams and with another point at the right-hand corner of that figure. It is assumed that the beams x' and y' are oriented and moved in accordance with the principles explained above and that the reflectors 10, 10" are separated by a minimum possible distance horizontally and a maximum possible distance vertically.

As the beams sweep across the diamond-shaped space, reflections of the beam x' are received at the measuring station when it is at its positions designated by $x_1'$ and $x_2'$, and reflections of the y' beam are received when it is in its position designated by $y_1'$ and $y_2'$. Apart from the principles of this invention, these values, corresponding to four beam intersections, would imply four possible positions for the reflectors 10 and 10", precisely as in the situation illustrated in FIG. 1. However, because the orientations and sweep directions of the beams have a known relationship to reflector positions, it is possible to ascertain true reflector positions in the situation illustrated in FIG. 5 by examining the momentary positions of the beams at which reflections were received and comparing them for increasing values of the x and y coordinates. Observing that the first reflection of the x' beam was detected when it was in its sweep position designated by $x_1'$, it is evident that no reflector can be present that has a smaller x coordinate than $x_1$40 (that is, to the left of and below the shaded position of the x beam); and by the same reasoning it is known that there can be no reflector with a y value between zero and $y_1'$ (that is, in the area above and to the right of the position of the y' beam that is designated $y_1'$). Since a reflection is received with the beams in those positions, the reflector producing it could be thought to lie somewhere along the y' beam in its $y_1'$ position and somewhere along the x' beam in its $x_1'$ position. But it is known that there is no reflector to the left of the $x_1'/y_1'$ position, and neither beam had to move to the right of that position for a reflection to be received from both beams. Hence, it is unambiguously established that there is a reflector at the $x_1'/y_1'$ position. Furthermore, there can be no other reflector along the x' beam in its $x_1'$ position nor along the y' beam in its $y_1'$ position because any such other reflector would be at less than the minimum possible distance in the horizontal separation direction from the reflector known to exist at $x_1'/y_1'$; and the intersections $x_2'/y_1'$ and $x_1'/y_2'$ are thus known to be "empty". The position of the reflector 10 is thus umambiguously established, and the position of the reflector 10" can by similar reasoning be unambiguously established at the intersection $x_2'/y_2'$.

Generally, therefore, the positions of reflectors at the same distance from the measuring station can be unambiguously determined in a very simple manner, based upon the above described assignment of magnitudes to angular beam positions. During the scanning sweep of each of the criterion beams, each time a reflection of its radiation is received at the measuring station, a value corresponding to the momentary angular position of that beam in its sweep is stored. At the conclusion of a sweep cycle, the positions of the targets from which reflections were received can be unambiguously determined by coupling the values stored for each of those beams during the sweep cycle, in the order of their increasing magnitudes (i.e., increasing distance from the origin side), with the respective values stored for the other criterion beam or criterion beams, taken in the same order.

Thus, with respect to FIG. 5 the values stored for the x' beam will be $x_1'$ and $x_2'$, and the values stored for the y' beam will be $y_1'$ and $y_2'$. Coupling values from the two sets in the order of ascending magnitudes, lowest-with lowest, highest-with-highest, gives reflector positions at $x_1'/y_1'$ and $x_2'/y_2'$.

Apparatus required for this procedure comprises a logic circuit with a memory having different memory positions in which are stored the x and y coordinates that correspond to successively received reflections of each criterion beam and from which the coordinates are taken, upon reading of the memory, in a consistent order of magnitude for every criterion beam.

It will be understood that for the purpose of the herein described coordinate coupling procedure it is not necessary that every criterion beam sweep start on the origin side of the swept space in every sweep cycle, nor even that all criterion beam sweeps during a single cycle be in the same direction, but merely that the magnitude values assigned to angular beam positions be in a consistent relationship to an arbitrarily chosen origin point at one side of the swept space. If there are beams other than the criterion beams, their orientations and directions of sweep may be as desired. It is necessary that there be an ascertained or ascertainable solid angle that is swept by both criterion beams so that a target in that space that gives rise to a reflection of one criterion beam will also produce a detected reflection of the other. Nevertheless, this does not require the criterion beams to have identical cross-sections (i.e., they may have different lengths); much less is it necessary for the criterion beams to be oriented at right angles to one another or to their respective directions of sweep.

A surprising and very important result of orienting and moving the criterion beams in accordance with the principles of this invention is that it becomes possible for adjacent reflectors at equal distances from the measuring station to be arranged at substantially smaller distances apart in the separation direction that the minimum spacing for which the criterion beams are oriented, provided that such reflectors are arranged in accordance with another of the principles of this invention. Thus, two or more reflectors can be mounted rather close to one another on the same side of one and the same object and—provided they are arranged in conformity with the principle now to be explained—unambiguous measurements can be made on each of them.

Figure 14:
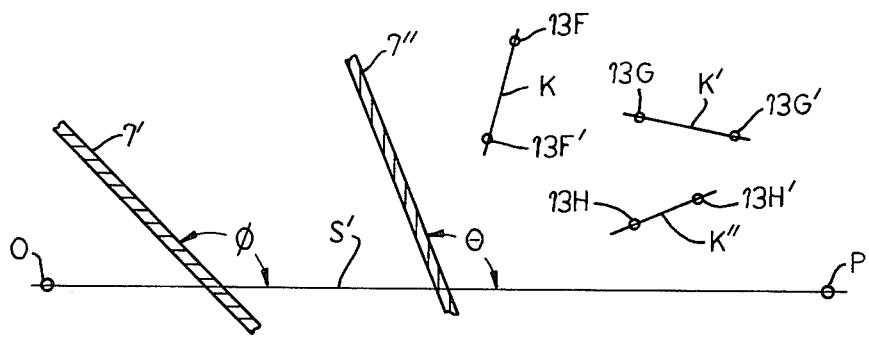
FIG. 14 is a diagram of various permissible arrangements in relation to one another of reflector pairs at like distances from the measuring station.

The requirement concerning reflector arrangement applies only to such reflectors as are at substantially equal distances from the measuring station, that is, such reflectors as cannot be discriminated by range measurements, or range gating. The permissible arrangements of such reflectors in relation to one another are dependent upon the slopes of the criterion beams 7', 7" in relation to a line S' (see FIG. 14) through the origin point O and the opposite point P, which line of couse extends in the separation direction. Relative to the line S', the criterion beam 7' has the slope $\phi$ and the criterion beam 7" has the slope $\phi$. A line K, K' or K" connecting any two reflectors 13F, 13F' or 13G, 13G' or 13H, 13H', respectively, that are at the same distance from the measuring station must have a slope in relation to the line S' that is outside the range of slopes between $\phi$ and $\theta$, inclusive.

When this requirement is fulfilled as to every such pair of reflectors within the space swept by the criterion beams, it will be found that every reflector 13 will be the only reflector occupying a region of isolation 17 which is depicted in FIG. 3 and which is related to the orientations of the criterion beams and to the separation direction.

In the direction of propagation of the beams, the region of isolation 17 has a depth b which is at least equal to the resolving power of the distance measuring apparatus, that is, at least equal to the smallest incremental distance to which distance measurements can be made, so that any reflector which is measurably closer to the measuring station or measurably farther from it than the reflector 13 will be outside the region of isolation for the reflector 13. Thus, the distance zone within which the region of isolation lies is defined by a pair of imaginary spherical surfaces which are centered on the measuring station and which are spaced equal distances to opposite sides of the reflector 13, the distance between said imaginary surfaces being at least equal to the resolving power value of the distance measuring apparatus.

Within that distance zone, the region of isolation 17 is defined on the assumption that the two criterion beams are simultaneously in angular positions of their sweep such that both are intercepted by the reflector 13 (i.e., they are assumed to intersect at the reflector), and the region of isolation constitutes the part of the aforesaid zone that is then occupied by those beams, together with that part of said zone that extends between those beams in the separation direction. The region of isolation thus has approximately the shape of an hourglass with its neck at the reflector 13 that is exclusive to it.

It is of no consequence that the region of isolation for a given reflector may contain other surface or elements that reflect radiation generally, the important point being that the particular reflector to which the region is assigned must be the only one therein that can produce a reflection of beam radiation that is detectable at the measuring station. There can be overlap between regions of isolation for adjacent reflectors at the same distance from the measuring station, provided no reflector intrudes into the region of isolation for another. If such reflectors are so arranged that each meets the requirement that it is the only reflector in its region of isolation, then unambiguous measurements of reflector positions are assured.

Turning back to FIG. 5, it will be seen that even if the reflectors 10, 10" are spaced apart by substantially less than the minimum distance in the separation direction (i.e., horizontally) with respect to which the beams are oriented, the positions of those reflectors can be unambiguously ascertained if they are arranged in proper regions of isolation as just explained. Although the situation there depicted has caused four beam intersections to be defined, signifying four supposedly possible reflector positions, it is known that the reflectors 10 and 10" are arranged in regions of isolation that are matched to the orientation and sweep direction of the beams, and accordingly two of these four possible positions are established as "empty". The position $x_2'/y_1'$ is known to be impossible because a reflector in any of the other three possible positions would have to be within the region of isolation of that one reflector, and therefore it would have to be the only reflector in the swept space, whereas it is known that a least two reflectors are present. By similar reasoning it can be known that no reflector can be present at the position designated $x_1'/y_2'$.

Since there is an interdependent relationship between beam orientation and sweep direction on the one hand, and the configuration of the regions of isolation on the other hand, either can be taken as the starting point in the design of a measurement system according to the invention.

If the distribution of target reflectors can be controlled only to the extent that it is possible to ascertain directions of probable maximum and minimum separation and probable "worst case" separations in those directions, then orientation and sweep direction of the criterion beams can be established on the basis of that information, as explained above. Note that if the "worst case" distribution of reflectors for which the beam arrangement is established is in fact the worst distribution ever encountered, then every reflector will always be in its own unviolated region of isolation 17.

If the distribution of target reflectors is more closely controllable, so that an hourglass-shaped region of isolation 17 can be defined and maintained for each reflector of every pair of adjacent reflectors that are at the same distance from the measuring station, all such regions being of like shape, then the criterion beams can be oriented by reference to that region of isolation. Specifically, the orientation of the long dimensions of the criterion beams must be such that those two beams, if they were simultaneously intersecting the target 13, would lie within its region of isolation 17. Preferably, as shown in FIG. 2, the criterion beams would be oriented to have their long dimensions 8', 8" parallel to the diagonal boundaries of the region of isolation 17. The directions of sweep of the criterion beams will be so chosen that each will cross the reflector in movement from one to the other of the "permitted" zones laterally adjacent to its region of isolation.

Figure 7:
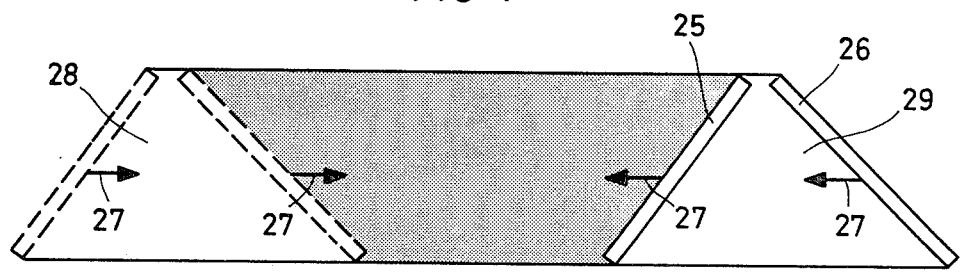
FIG. 7 is a view in cross-section of the space swept by the beams shown in FIG. 6.

Under certain conditions it is advantageous for the beams to move in a fixed relationship to one another like that shown in FIG. 7. This permits the mechanism of the deflection device 11 to be substantially simplified. In the arrangement shown in FIG. 7, the two beams 25 and 26 have their long dimensions oriented as different angles oblique to the horizontal, and they sweep horizontally, as denoted by arrows 27, both always in the same horizontal direction and in a fixed spaced relation to one another. Because both beams sweep horizontally, it will be apparent that the solid angle or space that they jointly sweep can be substantially elongated horizontally, as denoted by the shaded area in FIG. 7, making the arrangement especially suitable for measurements on target bodies confined to the surface of land or water. However, with this arrangement there are spaces 28, 29 that are swept, in each case, by only one of the two beams. A target in one of those spaces would therefore give rise to only one reflection during a beam sweep cycle, the calculation of target positions, although possible, might be complicated. Therefore, to simplify calculations, it is desirable that the optical system be provided with a shield, preferably placed in an intermediate image plane, for masking off the spaces 28 and 29, thus ensuring that a reflection from a target will be received for every beam whenever a reflection is received from any beam.

If the beams make their sweeps successively, the detector 4 can comprise a single channel, but if two or more beams make their sweeps simultaneously, the detector will have a channel for each such beam or the respective beams will be pulsed at different times.

Figure 6:
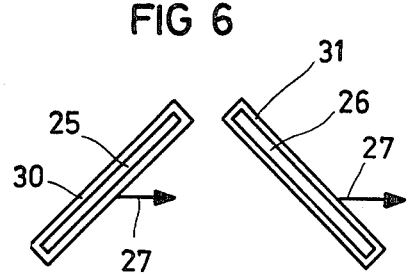
FIG. 6 is a view of a pair of radiation beams, taken transversely to their direction of propagation, that are in another arrangement which is in accordance with the principles of this invention.

With the arrangement as shown in FIG. 7, wherein the beams 25 and 26 make their sweeps simultaneously, reflections from either beam might be detected at the measuring station 2 by the detector channel associated with the other beam. To prevent this, as shown in FIG. 6, the channels of the detector 4 at the measuring station 2 can have fields of response or scanning windows 30, 31 which are substantially matched to the cross-section shape and size of the respective beams 25 and 26 with which the channels are associated and which move with their associated beams. FIG. 6 represents the beams 25 and 26 and their respective fields of response 30 and 31 as seen in cross-section at an arbitrary distance in front of the measuring station 2.

The restricted scanning windows or fields of response 30 and 31 afford the further advantage of improving the signal-to-noise relationship and consequently affording a greater sensitivity and distance range than would be the case if the detector 4 had a single field of reception that covered both beams or the entire space swept by the beams.

Figure 8:
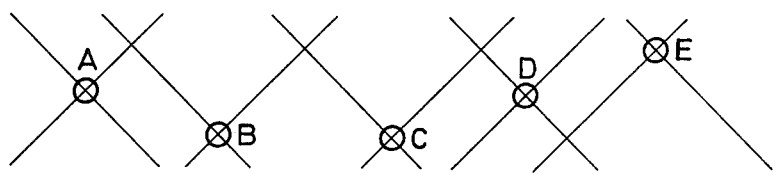
FIG. 8 is a diagrammatic view explaining how, with the application of the principles of this invention, unambiguous measurements can be made on target reflectors that are closely adjacent to one another.

When the spaces 28 and 29 that are swept by less than all of the beams are not masked off, unambiguous measurements of reflector locations can be made by logical analysis. FIG. 8 illustrates a situation in which several reflectors A–E are arranged in more or less horizontal alignment with one another, and the figure indicates successive momentary angular positions of each of the beams 25 and 26 of FIGS. 6 and 7 at instants when reflections of their radiation, returned from the several reflectors, are detected at the measuring station. If, within the portion of the solid angle that is swept by both beams, one beam has a target intercepting position at which it has only one point of intersection with the other beam, then that point of intersection designates a valid target which is unambiguously ascertained, and the positions of the other targets can be unambiguously ascertained by logic. Thus, in FIG. 8 the beam 25, when it intersects the target D, is in a position in which it makes only one intersection with the beam 26. It follows that the indicated position of target D is a real target position, and targets cannot exist at the beam intersection positions that are above and between targets C and D and below and between targets D and E. Elimination of the impossible target positions defined by the last mentioned beam intersections enables the real positions of targets C and E to be unambiguously ascertained, and so on, using the same reasoning as was employed in connection with FIG. 5.

Figure 9:
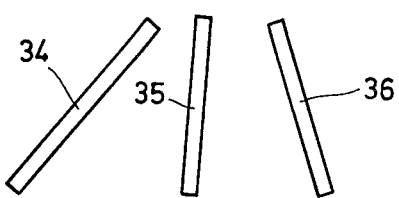
FIG. 9 is a view generally similar to FIG. 6 but illustrating another beam arrangement that is in accordance with the principles of this invention.

If targets within the swept space are so close to one another that no such starting point as used in the last example is expectable, and if for some reason it is considered undesirable to mask the portion or portions of the solid angle swept by only one beam, then it is possible to employ the arrangement shown in FIG. 9, using three beams 34, 35, 36, each having its long dimension at an angle to that of each of the others and all having movement in the separation direction with respect to an origin point. Here, a region of isolation for each reflector, such as is illustrated in FIG. 3, has its boundaries defined by any two of the beams, on the assumption that those two criterion beams are simultaneously in positions of their angular motion such that both are intercepted by the reflector for the region of isolation. Thus the region of isolation could be defined by reference to the cross-sections of the two outer beams 34 and 36, and the region of isolation illustrated in FIG. 3 would be so configured that the cross-sections of those two beams would lie wholly within the boundaries of its oblique side planes 20'-20" and 19'-19". Alternatively, the middle beam 35 and either of the outer beams 35 or 36 would define the boundaries of a narrower region of isolation, that is, one having a smaller angle between its oblique side planes 20'-20" and 19'-19". In principle, such reduction of the width of the region of isolation would be advantageous insofar as it would facilitate identification of "empty" beam intersection points which do not designate locations of real targets, but it would have the disadvantage of permitting adjacent reflectors to be closer to one another and thus limiting the possibility for discrimination between them.

Figure 10:
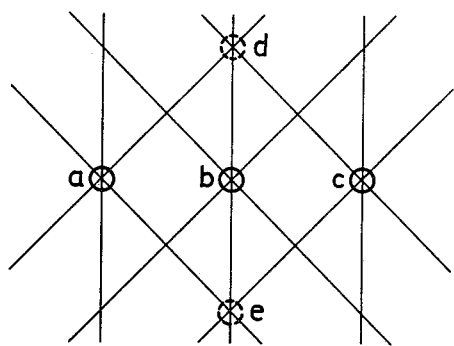
FIG. 10 is a diagrammatic view illustrating certain relationships of beam positions to targets and explaining how target positions are unambiguously ascertained.

FIG. 10 illustrates how beam intersections corresponding to real reflectors can be distinguished from "empty" intersections when three beams are used. As shown in FIG. 10, reflectors a, b and c, which are assumed to be at equal distances from the measuring station, lie along a line extending generally in the direction of sweep of three beams oriented generally like the beams 34, 35, 36 of FIG. 9. Both above and below the points of beam intersection that are defined by reflectors a, b and c there are points at which all three beams intersect to signify apparent reflector positions. To distinguish real reflector positions from "empty" ones, the scheme of beam intersections is examined for a valid one at which all three beams intersect. By reasoning like that applied in connection with FIG. 3, is is evident that reflector a is at such a position and that there must be a real reflector at that position. It follows that positions d and e must be "empty" positions, since reflectors at those positions would be within the region of isolation of the reflector a, and from this, in turn, the positions of reflectors b and c are unambiguously ascertained.

Figure 11:
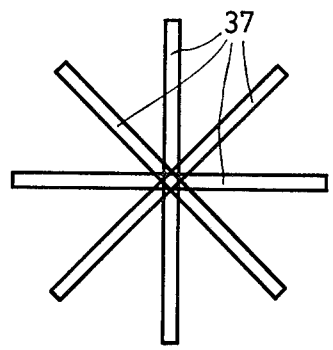
FIG. 11 illustrates still another beam arrangement that is in accordance with the principles of this invention.

In some cases it may be advantageous to employ a beam system such as is illustrated in FIG. 11, comprising four beams 37 having their long cross-section dimensions so oriented that if they intersected simultaneously at a point they would define a symmetrical star-shaped pattern. In this case, all of the beams are swept in the same direction. Thus, assuming that all of the beams in FIG. 11 were swept horizontally, measurements made with the edgewise-sweeping horizontally oriented beam would be disregarded because they would be meaningless. The region of isolation for each reflector would be matched to the orientations of a selected pair of criterion beams and in this case would be either 45° or 90°. The advantage of the beam arrangement of FIG. 11 is that it permits any desired orientation of the beam system and its sweep direction, so that it can be readily converted from one application to another in which conditions are different.

From the foregoing description taken with the accompanying drawings it will be apparent that this invention provides a method and means for employing angularly sweeping fan-shaped beams of radiation for unambiguous determination of the positions of reflectors in the space swept by the beams that are at equal distances from a measuring station from which the beams are emitted.

The invention is defined by the following claims

I claim:

1. A method of unambiguously determining the position of each of a plurality of reflectors in relation to a measuring station at the apex of a solid angle space in which the reflectors are located and from which radiation is emitted into said space, each of said reflectors being of the type whereby intercepted radiation is reflected in the direction directly opposite to the one from which it arrived at the reflector, and the reflectors being so distributed in said space that adjacent reflectors at equal distances from said station are always separated by at least a minimum projected distance in a separation direction and by no more than a maximum projected distance in a direction transverse to said separation direction, said method being characterized by:

A. emitting said radiation in the form of at least two fan-shaped beams, each of which has a long cross-section dimension and a short cross-section dimension, said long dimension of each of said at least two beams being oriented
  (1) at an angle to that of the other and
  (2) at an angle to said separation direction which is such that its tangent value is greater than the ratio of said maximum distance to said minimum distance; and B. sweeping each of said two beams in a direction such that each of them moves across said space between intersection with an origin point at one side of said space and intersection with another point which is at the opposite side of said space and which is spaced in said separation direction from said origin point.

2. The method of claim 1, further characterized by:

C. assigning magnitudes to angular positions of each beam that increase with increasing distance of the beam from said origin point.

3. The method of claim 2, wherein said measuring station comprises a detector by which beam radiation reflected back to said measuring station by a reflector can be detected, further characterized by:

D. each time a reflection of radiation of one of said two beams is detected at the measuring station, storing the magnitude of the then-existing angular position of the beam; and E. unambiguously ascertaining the position of each reflector from which reflections were received during a sweep cycle by coupling stored values for one of said two beams, taken in the order of their magnitudes, with those for the other of said two beams, taken in the same order.

4. A method of ascertaining, by means of radiation emitted from a measuring station, the locations relative to said station of reflectors that are remote therefrom and towards which the radiation is emitted, each of said reflectors being of a type that reflects said radiation in the direction directly opposite to that from which it arrived at the reflector, and said radiation being emitted in fan-shaped beams, each having a long dimension and a transverse short dimension, both transverse to the direction of beam propagation, every beam being swept angularly across a solid angle space that has the measuring station at its apex so that momentary reflections of its radiation can be detected by detector means at said measuring station, said method being characterized by:

A. orienting said long dimension of each of said beams at an angle to that of every other;

B. sweeping each of at least two of said beams substantially transversely to its said long dimension in a direction such that each moves across said space between intersection with an origin point at one side of said space and intersection with another point which is at the opposite side of said space and which is spaced in a separation direction from said origin point; and C. maintaining such relationship between the two reflectors of every pair thereof in said space that are at substantially equal distances from said station that each of such reflectors is in a region from which the other is excluded and which comprises the part of said space that would be occupied by said two beams if they were simultaneously in positions of their respective sweeps at which both were intercepted by that reflector, together with the part of said space that would extend between the beams in said separation direction.

5. The method of claim 4 wherein said two beams have their long dimensions at equal and opposite angles to a plane which extends in said separation direction and bisects the apex angle of said solid angle space.

6. The method of claim 5 wherein radiation is emitted in a third beam which has its said long dimension at an angle to that of each of said two beams and moves across said space from intersection with one of said points to intersection with the other of them.

7. The method of claim 4, further characterized by:
D. at the measuring station, masking the portions of said solid angle space that are swept by only one of said at least two beams, so that reflections from reflectors in said portions of said space cannot be detected by said detector means.

8. The method of claim 6, further characterized by:
at the measuring station, masking the portions of said solid angle space that are swept by less than all of the beams so that reflections from reflectors in said portions of said space cannot be detected by said detector means.

9. The method of claim 4 wherein angular positions of each of said two beams are assigned magnitudes that increase with increasing distance of the beam from said origin point, further characterezed by:
D. each time a reflection of radiation of one of said two beams is detected by said detector, storing the magnitude of the then-existing angular position of that beam; and
E. unambiguously ascertaining the position of each reflector from which reflections of each of said at least two beams have been detected by said detector by coupling stored values for one of said two beams, taken in the order of their magnitudes, with those for the other of said two beams, taken in the same order.

10. The method of ascertaining at a measuring station, by means of radiation emitted therefrom and reflections thereof detected by a detector at said station, the locations relative to said station of reflectors towards which the radiation is emitted and each of which is of a type that reflects radiation directly oppositely to the direction from which it arrived thereat, said radiation being emitted from said station in fan-shaped beams, each having a long cross-section dimension and a narrow cross-section dimension transverse to its said long dimension, each having its said long dimension oriented at an angle to that of every other beam, and each being swept angularly, substantially transversely to its said long dimension, across a solid angle space that is swept by every other beam and has the measuring station at its apex, said method being characterized by:
A. sweeping at least two beams in directions such that each moves between its intersection with an origin point at one side of said space and its intersection with another point which is at the opposite side of said space and is spaced in a separation direction from said origin point, so that the momentary angular positions of each of said beams can be assigned values that increase in magnitude with increasing distance from said origin point;
B. maintaining, as between the reflectors of every pair thereof in space that are at substantially equal distances from said station, a relationship such that each of such reflectors is in a region from which the other is excluded and which comprises the part of said space that would be occupied by said two beams if they were simultaneously in positions of their respective sweeps at which both were intercepted by that reflector, together with the part of said space that would extend between said beams in said separation direction;
C. each time a reflection of radiation of one of said at least two beams is detected at said detector, storing the value of the then-existing angular position of that beam; and
D. after each of said at least two beams has made at least one sweep across said space, unambiguously ascertaining the position of each reflector from which reflections were detected by coupling the values stored for each of said at least two beams, taken consistently in order of magnitudes, with those for the other of said two beams taken in the same order of magnitudes.

11. The method of claim 10, wherein the reflectors are carried on the earth's surface, further characterized by:
(1) each of said two beams having its said long dimension at an angle to the horizontal; and
(2) each of said two beams being swept substantially horizontally.

12. Apparatus by which the position of any one of a plurality of reflectors can be unambiguously determined in relation to a measuring station at the apex of a solid angle space in which the reflectors are located, each of said reflectors being of the type whereby intercepted radiation is reflected in the direction directly opposite to the one from which it arrived at the reflector, and the reflectors being so distributed in said space that adjacent reflectors at equal distances from said station are normally separated by at least a minimum projected distance in a separation direction and by no more than a maximum projected distance in a direction transverse to said separation direction, said apparatus being of the type comprising a radiation emitter at the measuring station for emitting a plurality of fan-shaped beams of radiation, each of which has a long cross-section dimension and a short cross-section dimension, said emitter being arranged to sweep each beam angularly, substantially transversely to its said long dimension, across said solid angle space, said apparatus being characterized by: said emitter being further arranged
A. to emit at least two of said beams with their said long dimension oriented
(1) at an angle to one another and
(2) at an angle to said separation direction which is such that its tangent value is greater than the ratio of said maximum distance to said minimum distance; and
B. to sweep each of said two beams in a direction such that the beam moves between intersection with an origin point at one side of said space and intersection with another point which is at the opposite side of said space and which is spaced in said separation direction from said origin point.

13. The apparatus of claim 12, wherein the slope of said long dimension of one of said beams relative to a separation direction line connecting said points has a first value and the slope of said long dimension of the other of said beams relative to said line has a second value, further characterized by:

said reflectors being so arranged that a line through any two reflectors that are within said space and at substantially equal distances from the measuring station has a slope in relation to said separation direction line that is outside the range of values which lies between and includes said first and second values.

* * * * *